United States Patent
Lee

(10) Patent No.: US 11,721,027 B2
(45) Date of Patent: Aug. 8, 2023

(54) TRANSFORMING SPORTS IMPLEMENT MOTION SENSOR DATA TO TWO-DIMENSIONAL IMAGE FOR ANALYSIS

(71) Applicant: Sony Corporation, Tokyo (JP)

(72) Inventor: Jong Hwa Lee, San Diego, CA (US)

(73) Assignee: Sony Group Corporation, Tokyo (JP)

( * ) Notice: Subject to any disclaimer, the term of this patent is extended or adjusted under 35 U.S.C. 154(b) by 59 days.

(21) Appl. No.: 16/897,022

(22) Filed: Jun. 9, 2020

(65) Prior Publication Data

US 2021/0383101 A1 Dec. 9, 2021

(51) Int. Cl.
| | |
|---|---|
| *G06T 7/20* | (2017.01) |
| *G06N 20/00* | (2019.01) |
| *G06T 7/70* | (2017.01) |
| *G06V 40/20* | (2022.01) |
| *G06V 10/764* | (2022.01) |
| *G06V 10/44* | (2022.01) |
| *G06V 20/20* | (2022.01) |
| *G06F 18/24* | (2023.01) |

(52) U.S. Cl.
CPC ............... *G06T 7/20* (2013.01); *G06F 18/24* (2023.01); *G06N 20/00* (2019.01); *G06T 7/70* (2017.01); *G06V 10/454* (2022.01); *G06V 10/764* (2022.01); *G06V 40/20* (2022.01); *G06V 40/23* (2022.01); *G06T 2207/20084* (2013.01); *G06V 20/20* (2022.01)

(58) Field of Classification Search
CPC ............. G06K 9/00335; G06K 9/6267; G06K 9/6274; G06T 7/70; G06T 7/20; G06T 2207/20084; G06T 2207/20081; G06T 2207/10016; G06T 2207/30221; G06N 20/00; G06N 3/08; G06N 3/0454; G06V 10/454; G06V 20/20; G06V 40/23; G06V 40/20
See application file for complete search history.

(56) References Cited

U.S. PATENT DOCUMENTS

| | | | | |
|---|---|---|---|---|
| 9,211,439 | B1* | 12/2015 | Pedenko | G16H 20/30 |
| 2005/0272517 | A1 | 12/2005 | Funk et al. | |
| 2007/0298896 | A1 | 12/2007 | Nusbaum et al. | |
| 2010/0323805 | A1* | 12/2010 | Kamino | A63B 69/3608 |
| | | | | 473/409 |
| 2014/0213382 | A1 | 7/2014 | Kang et al. | |
| 2018/0339223 | A1* | 11/2018 | Haas | A63F 13/833 |
| 2020/0230482 | A1* | 7/2020 | Thornbrue | G01C 21/00 |

OTHER PUBLICATIONS

Wei, Haoran, Roozbeh Jafari, and Nasser Kehtarnavaz. "Fusion of video and inertial sensing for deep learning-based human action recognition." Sensors 19.17 (2019): 3680. (Year: 2019).*

* cited by examiner

*Primary Examiner* — Vu Le
*Assistant Examiner* — Tracy Mangialaschi
(74) *Attorney, Agent, or Firm* — John L. Rogitz

(57) ABSTRACT

3D motion sensor data from a sensor on an athletic implement such as a golf club is clipped around an impact event and the clip then reduced to its 2D components, which are combined into a single 2D image and provided to a machine learning algorithm to output an indication of a flaw in the motion (e.g., a flaw in a golf swing).

14 Claims, 6 Drawing Sheets

- Project 3D swing motion onto 2D plane
- Time series data consists of measured position and orientation. Club head trajectory calculated by position and orientation is formatted as "images", allowing the CNN to automatically extract discriminative features FIG. 5   3D projection onto 2D plane

TRANSFORMING SPORTS IMPLEMENT MOTION SENSOR DATA TO TWO-DIMENSIONAL IMAGE FOR ANALYSIS

FIELD

The application relates generally to technically inventive, non-routine solutions that are necessarily rooted in computer technology and that produce concrete technical improvements.

BACKGROUND

Athletic techniques such as golf club swing have been analyzed using three-dimensional (3D) data such as video or motion sensed in 3D.

SUMMARY

As understood herein, while image classification models can train with standard RGB image format data (2D), human activity for sports spans a series of data points in time order and therefore contains high-dimensional such as video streams. There is thus a need to transform high-dimensional time series data (like video) into 2D discrete data (like images) so as to train image classification model without any model changes. As further understood herein, attempting to add dimension to a conventional image classification model so as to feed 3D or more dimension training data into the model is computationally expensive and suffers degraded accuracy compared to using 2D image data.

Accordingly, present principles use reduced dimensionality (2D) to extract features from image classification models to simplify analysis in time domain and to facilitate the use of image classification models that do not accept video data without upgrades to their dimensionality.

In one aspect, an assembly includes at least one processor configured to access at least one computer storage with instructions executable by the processor to receive from at least one motion sensor three-dimensional (3D) motion data. The instructions are executable to identify, using signals from the motion sensor, a time of impact. The instructions are further executable to identify a continuous sequence in the motion data from a time before the time of impact to a time after the time of impact. Also, the instructions are executable to identify a trajectory during the continuous sequence of an implement with which the motion sensor is engaged during the clip. The instructions are executable to transform the trajectory into x-y, y-z and z-x planes to render three position images, determine velocity components in the x-y, y-z and z-x planes to render three orientation images, and combine the orientation images and position images into a single planar image. The instructions are executable to input the planar image to at least one machine learning (ML) engine and receive as output from the ML engine in response to inputting the planar image an indication of at least one flaw in moving the implement.

In some implementations the instructions can be executable to determine the velocity components using swing decomposition from address to impact.

In example embodiments the assembly can include the motion sensor.

The implement can include a golf club or other implement such as a tennis racket, a table tennis paddle, a baseball bat, or a hockey stick.

In another aspect, an assembly includes at least one processor programmed with instructions to receive signals from at least one motion sensor, and using the signals, generate at least three two dimensional (2D) images. The instructions are executable to combine the three 2D images to render an input image, input the input image to at least one image classification model, and present indication concerning motion of an implement from the image classification model.

In another aspect, a method includes receiving signals from a motion sensor representing motion of an implement in three dimensions (3D) in a time domain. The method includes transforming information in the time domain to information in a 2D image domain and using the information in the 2D image domain to output a characterization of motion of the implement.

The details of the present application, both as to its structure and operation, can best be understood in reference to the accompanying drawings, in which like reference numerals refer to like parts, and in which:

DETAILED DESCRIPTION

Figure 1:
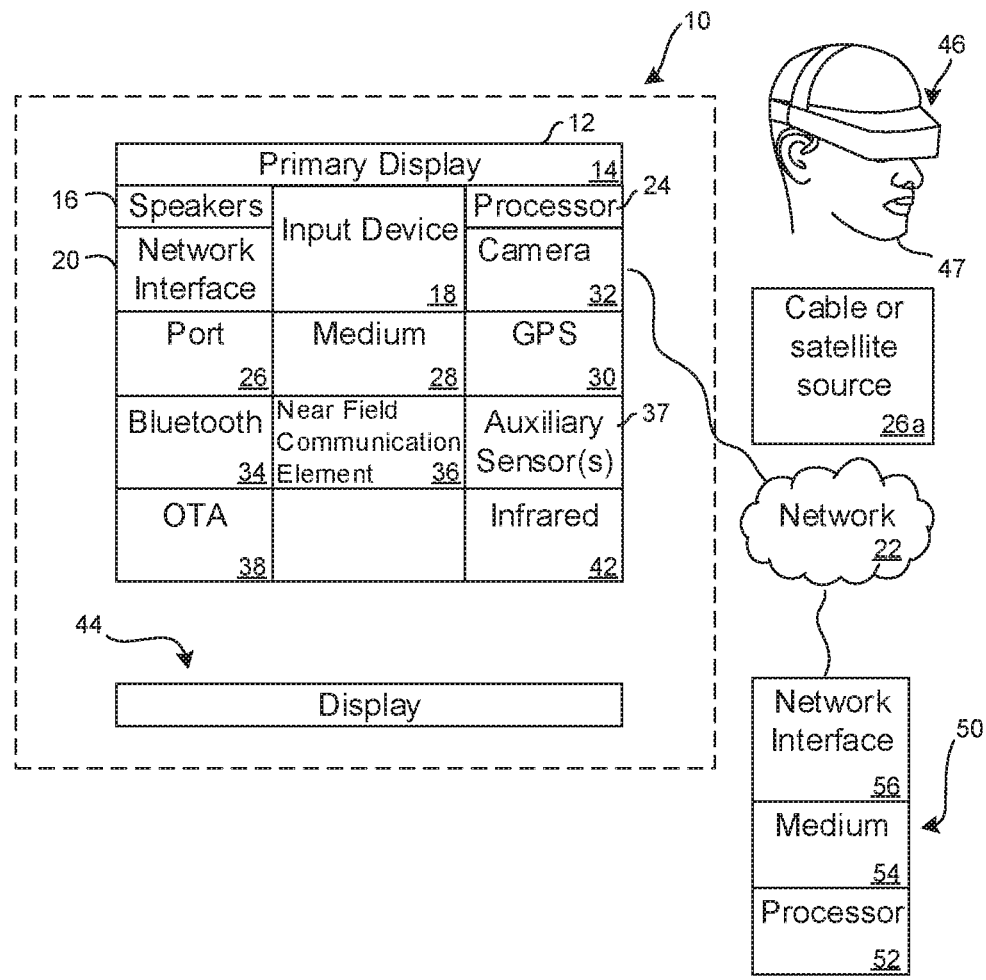
FIG. 1 is a block diagram of an example system including an example in accordance with present principles.

Present principles are directed to an image classification model for action detection or classification involved with time series data, for example, golf swings as well as also other sports participants wield equipment in such as tennis rackets, table tennis paddles, baseball bats, and hockey sticks.

This disclosure relates generally to computer ecosystems. A system herein may include server and client components, connected over a network such that data may be exchanged between the client and server components. The client components may include one or more computing devices including game consoles such as Sony PlayStation® or a game console made by Microsoft or Nintendo or other manufacturer virtual reality (VR) headsets, augmented reality (AR) headsets, portable televisions (e.g. smart TVs, Internet-enabled TVs), portable computers such as laptops and tablet computers, and other mobile devices including smart phones and additional examples discussed below. These client devices may operate with a variety of operating environments. For example, some of the client computers may employ, as examples, Linux operating systems, operating systems from Microsoft, or a Unix operating system, or operating systems produced by Apple Computer or Google. These operating environments may be used to execute one or more browsing programs, such as a browser made by Microsoft or Google or Mozilla or other browser program that can access websites hosted by the Internet servers discussed below. Also, an operating environment according to present principles may be used to execute one or more computer game programs.

Servers and/or gateways may include one or more processors executing instructions that configure the servers to receive and transmit data over a network such as the Internet. Or, a client and server can be connected over a local intranet or a virtual private network. A server or controller may be instantiated by a game console such as a Sony PlayStation®, a personal computer, etc.

Information may be exchanged over a network between the clients and servers. To this end and for security, servers and/or clients can include firewalls, load balancers, temporary storages, and proxies, and other network infrastructure for reliability and security. One or more servers may form an apparatus that implement methods of providing a secure community such as an online social website to network members.

As used herein, instructions refer to computer-implemented steps for processing information in the system. Instructions can be implemented in software, firmware or hardware and include any type of programmed step undertaken by components of the system.

A processor may be any conventional general-purpose single- or multi-chip processor that can execute logic by means of various lines such as address lines, data lines, and control lines and registers and shift registers.

Software modules described by way of the flow charts and user interfaces herein can include various sub-routines, procedures, etc. Without limiting the disclosure, logic stated to be executed by a particular module can be redistributed to other software modules and/or combined together in a single module and/or made available in a shareable library.

Present principles described herein can be implemented as hardware, software, firmware, or combinations thereof; hence, illustrative components, blocks, modules, circuits, and steps are set forth in terms of their functionality.

Further to what has been alluded to above, logical blocks, modules, and circuits described below can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

The functions and methods described below, when implemented in software, can be written in an appropriate language such as but not limited to Java, C# or C++, and can be stored on or transmitted through a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and digital subscriber line (DSL) and twisted pair wires. Such connections may include wireless communication connections including infrared and radio.

Components included in one embodiment can be used in other embodiments in any appropriate combination. For example, any of the various components described herein and/or depicted in the Figures may be combined, interchanged, or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

Now specifically referring to FIG. 1, an example system 10 is shown, which may include one or more of the example devices mentioned above and described further below in accordance with present principles. The first of the example devices included in the system 10 is a consumer electronics (CE) device such as an audio video device (AVD) 12 such as but not limited to an Internet-enabled TV with a TV tuner (equivalently, set top box controlling a TV). The AVD 12 alternatively may also be a computerized Internet enabled ("smart") telephone, a tablet computer, a notebook computer, a HMD, a wearable computerized device, a computerized Internet-enabled music player, computerized Internet-enabled head phones, a computerized Internet-enabled implantable device such as an implantable skin device, etc. Regardless, it is to be understood that the AVD 12 is configured to undertake present principles (e.g., communicate with other CE devices to undertake present principles, execute the logic described herein, and perform any other functions and/or operations described herein).

Accordingly, to undertake such principles the AVD 12 can be established by some or all of the components shown in FIG. 1. For example, the AVD 12 can include one or more displays 14 that may be implemented by a high definition or ultra-high definition "4K" or higher flat screen and that may be touch-enabled for receiving user input signals via touches on the display. The AVD 12 may include one or more speakers 16 for outputting audio in accordance with present principles, and at least one additional input device 18 such as an audio receiver/microphone for entering audible commands to the AVD 12 to control the AVD 12. The example AVD 12 may also include one or more network interfaces 20 for communication over at least one network 22 such as the Internet, an WAN, an LAN, etc. under control of one or more processors 24. A graphics processor 24A may also be included. Thus, the interface 20 may be, without limitation, a Wi-Fi transceiver, which is an example of a wireless computer network interface, such as but not limited to a mesh network transceiver. It is to be understood that the processor 24 controls the AVD 12 to undertake present principles, including the other elements of the AVD 12 described herein such as controlling the display 14 to present images thereon and receiving input therefrom. Furthermore, note the network interface 20 may be a wired or wireless modem or router, or other appropriate interface such as a wireless telephony transceiver, or Wi-Fi transceiver as mentioned above, etc.

In addition to the foregoing, the AVD 12 may also include one or more input ports 26 such as a high definition multimedia interface (HDMI) port or a USB port to physically connect to another CE device and/or a headphone port to connect headphones to the AVD 12 for presentation of audio from the AVD 12 to a user through the headphones. For example, the input port 26 may be connected via wire or wirelessly to a cable or satellite source 26a of audio video content. Thus, the source 26a may be a separate or integrated set top box, or a satellite receiver. Or, the source 26a may be a game console or disk player containing content. The source 26a when implemented as a game console may include some or all of the components described below in relation to the CE device 44.

The AVD 12 may further include one or more computer memories 28 such as disk-based or solid state storage that are not transitory signals, in some cases embodied in the chassis of the AVD as standalone devices or as a personal video recording device (PVR) or video disk player either internal or external to the chassis of the AVD for playing back AV programs or as removable memory media. Also in some embodiments, the AVD 12 can include a position or location receiver such as but not limited to a cellphone receiver, GPS receiver and/or altimeter 30 that is configured to receive geographic position information from a satellite or cellphone base station and provide the information to the processor 24 and/or determine an altitude at which the AVD 12 is disposed in conjunction with the processor 24. The component 30 may also be implemented by an inertial measurement unit (IMU) that typically includes a combination of accelerometers, gyroscopes, and magnetometers to determine the location and orientation of the AVD 12 in three dimensions.

Continuing the description of the AVD 12, in some embodiments the AVD 12 may include one or more cameras 32 that may be a thermal imaging camera, a digital camera such as a webcam, and/or a camera integrated into the AVD 12 and controllable by the processor 24 to gather pictures/images and/or video in accordance with present principles. Also included on the AVD 12 may be a Bluetooth transceiver 34 and other Near Field Communication (NFC) element 36 for communication with other devices using Bluetooth and/or NFC technology, respectively. An example NFC element can be a radio frequency identification (RFID) element.

Further still, the AVD 12 may include one or more auxiliary sensors 37 (e.g., a motion sensor such as an accelerometer, gyroscope, cyclometer, or a magnetic sensor, an infrared (IR) sensor, an optical sensor, a speed and/or cadence sensor, a gesture sensor (e.g. for sensing gesture command), etc.) providing input to the processor 24. The AVD 12 may include an over-the-air TV broadcast port 38 for receiving OTA TV broadcasts providing input to the processor 24. In addition to the foregoing, it is noted that the AVD 12 may also include an infrared (IR) transmitter and/or IR receiver and/or IR transceiver 42 such as an IR data association (IRDA) device. A battery (not shown) may be provided for powering the AVD 12, as may be a kinetic energy harvester that may turn kinetic energy into power to charge the battery and/or power the AVD 12.

Still referring to FIG. 1, in addition to the AVD 12, the system 10 may include one or more other CE device types. In one example, a first CE device 44 may be a smart golf sensor as described further below while a second CE device 46 may be implemented as head-mounted viewing device such as smart glasses or as a smart phone or tablet display. All devices in FIG. 1 may communicate with each other. A computerized device herein may implement some or all of the components shown for the AVD 12. Any of the components shown in the following figures may incorporate some or all of the components shown in the case of the AVD 12.

Now in reference to the afore-mentioned at least one server 50, it includes at least one server processor 52, at least one tangible computer readable storage medium 54 such as disk-based or solid state storage, and at least one network interface 56 that, under control of the server processor 52, allows for communication with the other devices of FIG. 1 over the network 22, and indeed may facilitate communication between servers and client devices in accordance with present principles. Note that the network interface 56 may be, e.g., a wired or wireless modem or router, Wi-Fi transceiver, or other appropriate interface such as, e.g., a wireless telephony transceiver.

Accordingly, in some embodiments the server 50 may be an Internet server or an entire server "farm", and may include and perform "cloud" functions such that the devices of the system 10 may access a "cloud" environment via the server 50 in example embodiments for, e.g., network gaming applications. Or, the server 50 may be implemented by one or more game consoles or other computers in the same room as the other devices shown in FIG. 1 or nearby.

The methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may be embodied in a non-transitory device such as a CD ROM or Flash drive. The software code instructions may alternatively be embodied in a transitory arrangement such as a radio or optical signal, or via a download over the internet.

Figure 2:
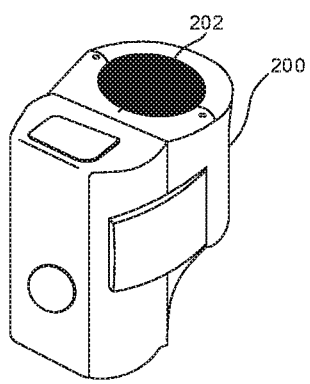
FIG. 2 is a perspective view of an example sensor assembly.
Figure 3:
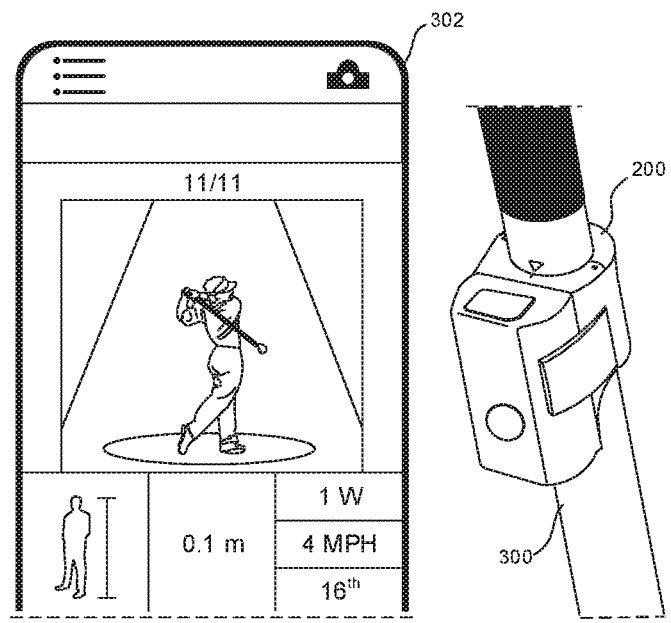
FIG. 3 is a perspective view of the assembly of FIG. 2 on the shaft of an athletic implement, in this case, a golf club.

FIG. 2 illustrates an example sensor assembly 200 that may be formed with a channel 202. As shown in FIG. 3 the shaft 300 of an athletic implement such as a golf club can be received in the channel 202 to tightly couple the sensor assembly 200 to the athletic implement. An image of the motion sensed by the assembly 200 may be presented on a computing device 302 such as any of the devices described herein.

The sensor assembly 200 may include any of the components of the CE device described above, including an IMU, processor, and wireless transceiver. The sensor assembly 200 generates (in the example shown) golf swing motion over time (time domain) which is transformed to the image domain according to description herein for image classification. In one example the assembly 200 may be implemented by a Sony golf sensor SSE-GL1 that measures a user's swing motion over time from address to attack as performed in the three spatial dimensions over time. The sensor assembly 200 may sense both 3D position and change of position (velocity), referred to as "orientation". The sensor assembly output may be calibrated to indicate the position and motion of the club head even though the sensor assembly itself is located on the shaft.

The information from the sensor assembly 200 may be wirelessly transmitted and provided to a computer executing a machine learning engine as discussed herein. In one example the machine learning engine may be implemented by the image classification model known as VGG16 that is configured to predict one of multiple (e.g., sixteen) golf swing errors using, in a non-limiting example, the classifications of the Titleist Performance Institute (TPI, available at https://www.mytpi.com/, disclosed as part of the instant file history and incorporated herein by reference).

Figure 4:
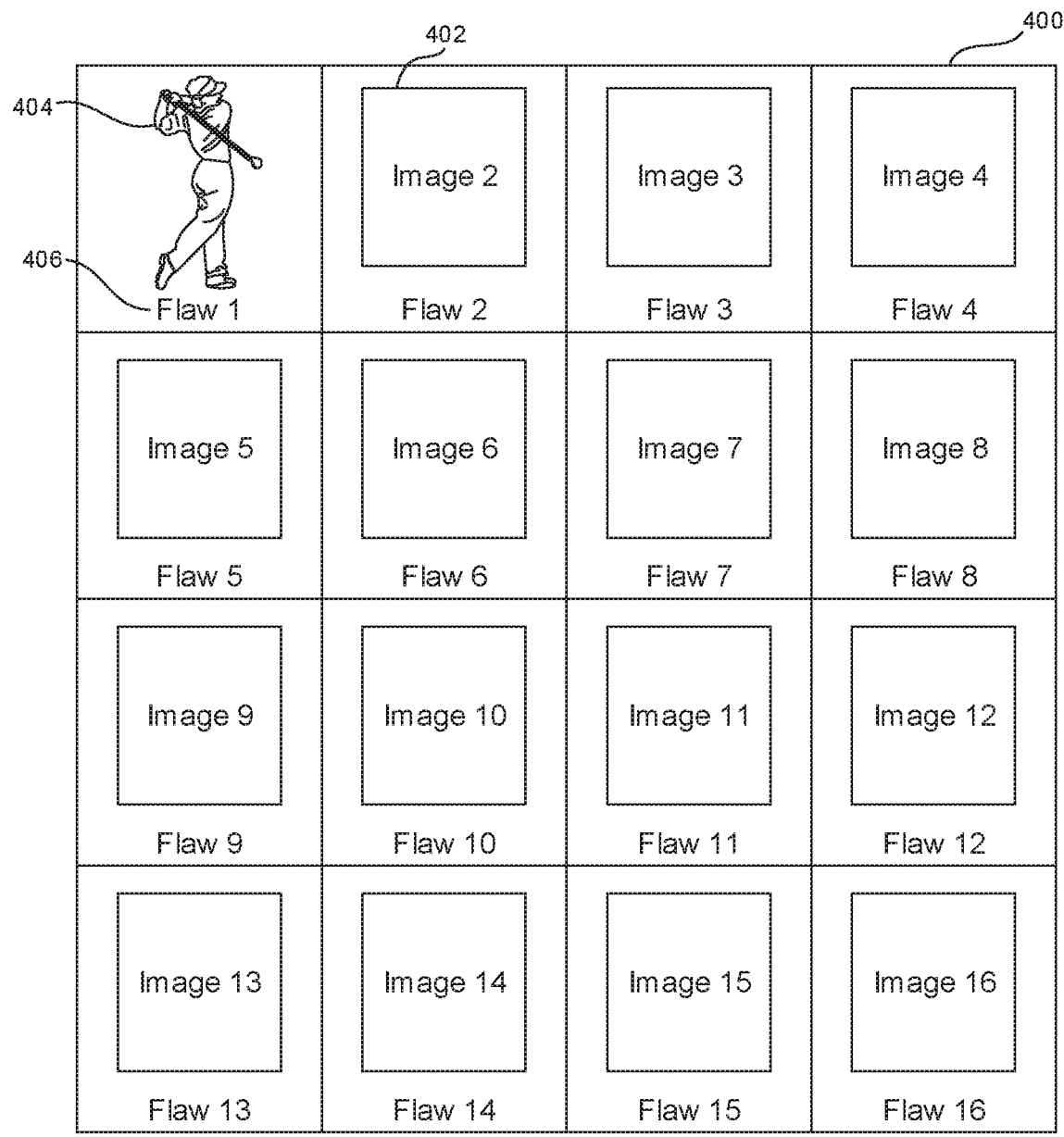
FIG. 4 illustrates a screen shot of images derived from sensor information and associated flaws in the motion.

As shown in FIG. 4, a display 400 may present multiple thumbnails 402 of golfer images 404 and accompanying alpha-numeric indications 406 of a flaw in the associated image which describe bad postures golfers can have during the swing. The image classification task controls which object appears on a picture. The image classification model VGG16 is discussed at https://arxiv.org/pdf/1409.1556.pdf, disclosed as part of the instant file history and incorporated herein by reference). VGG16 may include a convolutional neural network (CNN). Principles herein use, in some examples, VGG16 so that it takes an RGB image as an input and predicts one swing error out of the sixteen TPI characteristics classes as an output.

Figure 5:
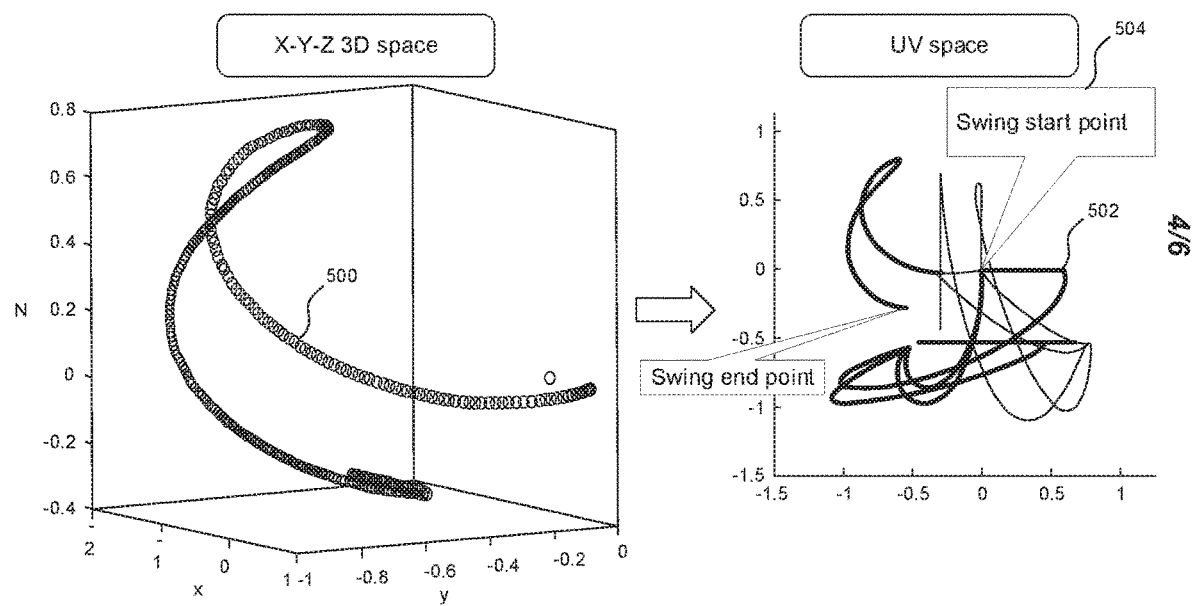
FIG. 5 graphically illustrates transforming 3D sensor data into a single 2D composite image.

Referring to FIG. 5 for a graphical illustration of the logic presented in FIG. 7 and described further below, to feed the image format data into VGG16 model, time series sensor data 500 in three dimensions is transformed to two-dimensional RGB image data 502. The two-dimensional RGB image data 502 can include a start point 504 and an end point 506 of the swing or of a clip of only part of the swing straddling impact time.

Figure 6:
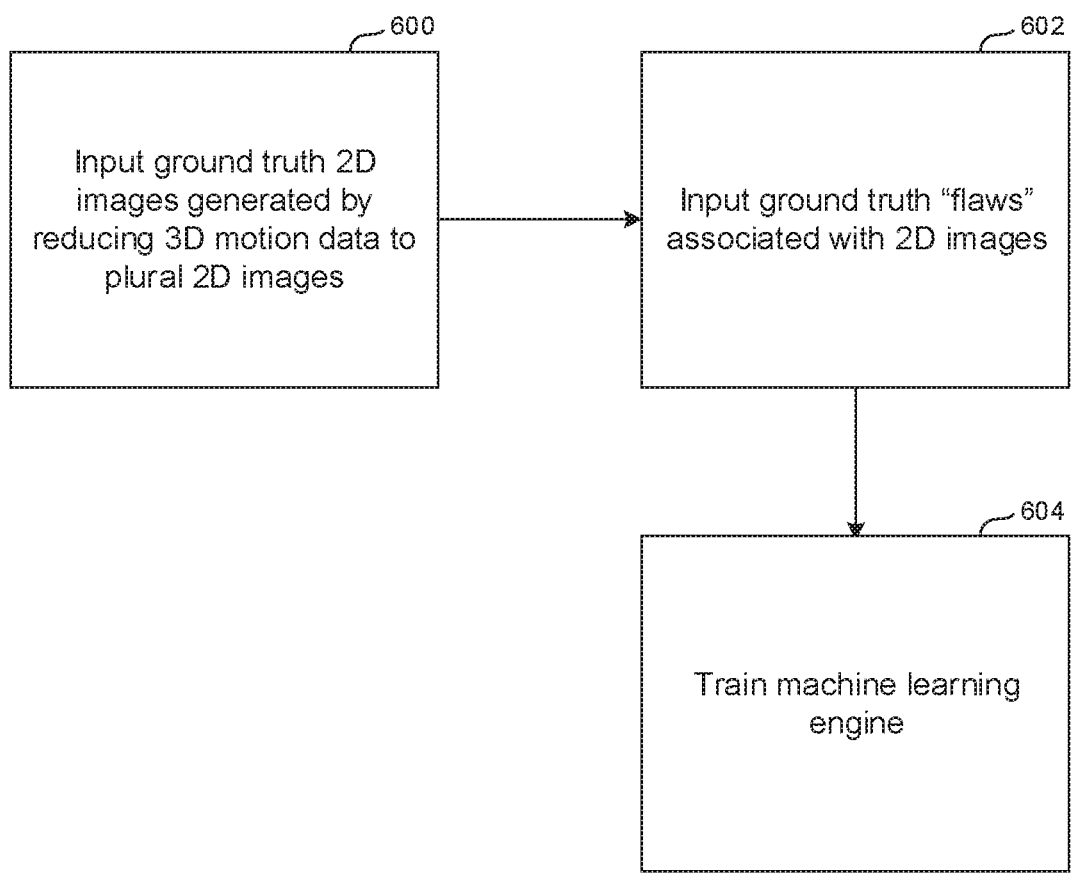
FIGS. 6 and 7 illustrate example logic in example flow chart format consistent with present principles.

FIG. 6 illustrates training. At block 600 ground truth 2D images that are generated according to the technique shown in FIG. 7 by reducing 3D motion data to its 2D components is input to the machine learning engine. Also, at block 602 the ground truth "flaw" associated with each of the images is input to the machine learning engine, which learns at block 604. The ground truth may be classified by an expert human or may be classified using known 3D image-to-flaw pairs from which the 2D ground truth images are generated.

Figure 7:
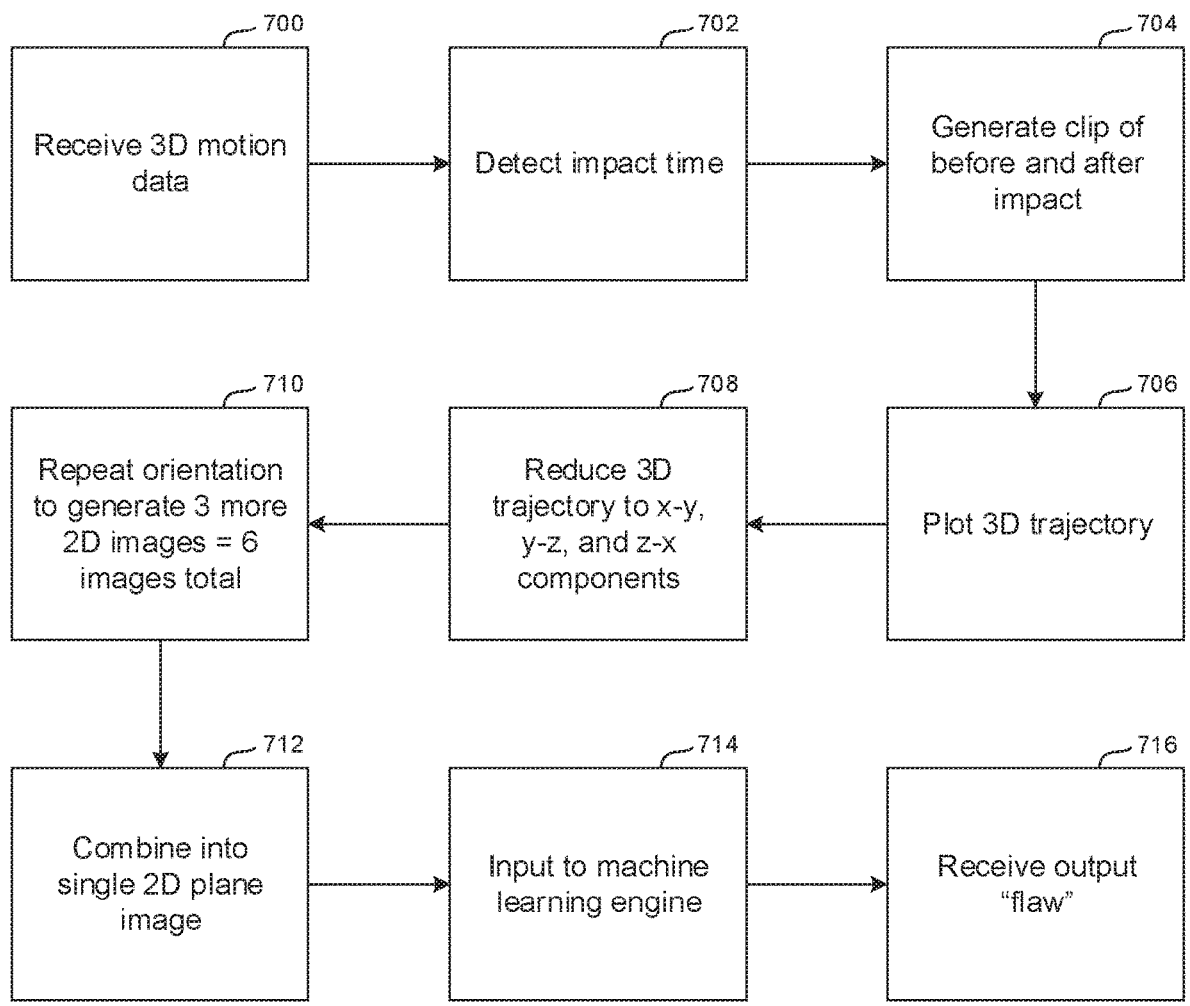

FIG. 7 illustrates post-training logic to convert 3D time domain sensor information from the sensor assembly 200 to the 2D image domain. Commencing at block 700, 3D motion data is received from the sensor assembly. Moving to block 702, the time of impact as indicated by the motion data is identified. This may be identified by, for example, the change of position x, y, z surges suddenly up.

Proceeding to block 704, a clip of, e.g., three consecutive seconds in length with two seconds being prior to impact and one second being used in an example implementation is generated. Moving to block 706, the trajectory of the club head position during the clip (or during the entire swing, if different) is plotted (which includes internal computer data structures representing the 3D motion). This step converts high-dimensional time series data into low-dimensional discrete data.

At block 708 the 3D trajectory is reduced or decoupled into its three spatial planes, i.e., the x-y, y-z, and z-x planes. Block 710 indicates that the orientation (in this context, meaning velocity) in the three two dimensional planes may be determined by swing decomposition from address to impact (or only during the clip, if different). Proceeding to block 712, the six 2D plots or images can be combined in a single image in the x-y plane (as shown in FIG. 5) such that time series data in X-Y-Z space is represented as discrete data in two-dimensional space, referred to as UV space". In FIG. 5 the origin of the six graphs indicates the start of the swing time and the end indicates the end of the swing time. The combined 2D image 502 shown in FIG. 5 and generated at block 712 in FIG. 7 is input to the machine learning engine at block 714, which presents an output at block 716 indicating one or more flaws in the swing.

Present principles facilitate image classification learning and prediction from high-dimensional time series data without any model update.

It will be appreciated that whilst present principals have been described with reference to some example embodiments, these are not intended to be limiting, and that various alternative arrangements may be used to implement the subject matter claimed herein.

What is claimed is:

1. An apparatus comprising:
at least one processor configured to access at least one computer storage with instructions executable by the processor to:
receive from at least one motion sensor three-dimensional (3D) motion data;
identify a continuous sequence in the motion data from a time before a time of impact to a time after the time of impact;
identify a trajectory during the continuous sequence of an implement with which the motion sensor is engaged;
transform the trajectory into x-y, y-z, and z-x planes to render three position images;
determine velocity components in the x-y, y-z, and z-x planes transformed from the trajectory to render three orientation images;
combine the orientation images and position images into a single two dimensional (2D) planar image;
input the planar image to at least one machine learning (ML) engine; and
receive as output from the ML engine in response to inputting the planar image an indication of at least one flaw in moving the implement.

2. The apparatus of claim 1, wherein the instructions are executable to determine the velocity components using swing decomposition from address to impact.

3. The apparatus of claim 1, comprising the motion sensor.

4. The apparatus of claim 1, wherein the implement comprises a golf club.

5. The apparatus of claim 1, wherein the implement comprises a tennis racket.

6. The apparatus of claim 1, wherein the implement comprises a table tennis paddle.

7. The apparatus of claim 1, wherein the implement comprises a baseball bat.

8. The apparatus of claim 1, wherein the implement comprises a hockey stick.

9. A method comprising:
receiving information from a motion sensor representing motion of an implement in three dimensions (3D) in a time domain;
transforming the information in the time domain to information in a 2D image domain at least in part by identifying a trajectory using the information in the time domain, transforming the trajectory into x-y, y-z, and z-x planes to render three position images, determining velocity components in the x-y, y-z, and z-x planes to render three orientation images, and combining the orientation images and position images to establish the information in the 2D image domain; and
using the information in the 2D image domain to output a characterization of motion of the implement.

10. The method of claim 9, wherein the characterization of motion comprises identifying a flaw from a set of "N" flaws, wherein "N" is an integer.

11. The method of claim 9, comprising:
identifying using signals from the motion sensor, a time of impact;
identifying a continuous sequence in the information from the motion sensor from a time before the time of impact to a time after the time of impact; and
identifying a trajectory during the continuous sequence of an implement with which the motion sensor is engaged.

12. The method of claim 9, comprising:
inputting the information in the 2D image domain to at least one machine learning (ML) engine; and
receiving from the ML engine the characterization of motion of the implement.

13. The method of claim 12, wherein the ML engine comprises at least one image classification model.

14. The method of claim 9, comprising:
inputting the information in the 2D image domain to at least one machine learning (ML) engine; and receiving as output from the ML engine an indication of at least one flaw in moving the implement.

\* \* \* \* \*